(12) United States Patent
Fujita et al.

(10) Patent No.: US 11,527,770 B2
(45) Date of Patent: Dec. 13, 2022

(54) CELL STACK AND REDOX FLOW BATTERY

(71) Applicant: SUMITOMO ELECTRIC INDUSTRIES, LTD., Osaka (JP)

(72) Inventors: Hayato Fujita, Osaka (JP); Kenji Motoi, Osaka (JP); Takashi Kanno, Osaka (JP); Takeshi Yamana, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/970,981

(22) PCT Filed: Feb. 27, 2018

(86) PCT No.: PCT/JP2018/007342
§ 371 (c)(1),
(2) Date: Aug. 19, 2020

(87) PCT Pub. No.: WO2019/167142
PCT Pub. Date: Sep. 6, 2019

(65) Prior Publication Data
US 2020/0403262 A1 Dec. 24, 2020

(51) Int. Cl.
*H01M 8/18* (2006.01)
*H01M 8/2465* (2016.01)

(52) U.S. Cl.
CPC ......... *H01M 8/188* (2013.01); *H01M 8/2465* (2013.01)

(58) Field of Classification Search
None
See application file for complete search history.

(56) References Cited

U.S. PATENT DOCUMENTS

| | | | |
|---|---|---|---|
| 2004/0170893 A1 | 9/2004 | Nakaishi et al. | |
| 2006/0046131 A1 | 3/2006 | Frank et al. | |
| 2008/0081247 A1* | 4/2008 | Nakaishi | H01M 8/0278 429/72 |
| 2011/0037159 A1* | 2/2011 | McElrea | H01L 24/82 257/686 |

(Continued)

FOREIGN PATENT DOCUMENTS

| | | |
|---|---|---|
| JP | 2000-260460 A | 9/2000 |
| JP | 2015-122230 A | 7/2015 |

(Continued)

OTHER PUBLICATIONS

JP-2017010791-A—machine translation (Year: 2017).*

(Continued)

*Primary Examiner* — Haroon S. Sheikh
(74) *Attorney, Agent, or Firm* — Oliff PLC (57) ABSTRACT

A cell stack including; a stacked body including a plurality of cell frames each having a bipolar plate whose outer periphery is supported by a frame member; and a pair of end plates that tighten the stacked body from both sides of a stacking direction thereof, wherein an area S [cm$^2$] of each cell frame as viewed from the stacking direction of the stacked body and a length W [mm] in the stacking direction of the stacked body satisfies a relationship $0.05 \leq W/S \leq 0.9$.

12 Claims, 9 Drawing Sheets

(56) References Cited

U.S. PATENT DOCUMENTS

| | | | |
|---|---|---|---|
| 2015/0125768 A1* | 5/2015 | Mosso | H01M 8/0278 |
| | | | 429/418 |
| 2017/0012299 A1 | 1/2017 | Itou et al. | |
| 2017/0047594 A1 | 2/2017 | Hanafusa et al. | |
| 2018/0159148 A1* | 6/2018 | Hotta | H01M 8/2404 |
| 2018/0277858 A1 | 9/2018 | Fujita et al. | |

FOREIGN PATENT DOCUMENTS

| | | |
|---|---|---|
| JP | 2015-122231 A | 7/2015 |
| JP | 2015-138771 A | 7/2015 |
| JP | 2015-210849 A | 11/2015 |
| JP | 2017010791 A * | 1/2017 |
| JP | 2017-027663 A | 2/2017 |
| WO | 2002/101864 A1 | 12/2002 |
| WO | 2012/032368 A1 | 3/2012 |
| WO | 2017/208570 A1 | 12/2017 |

OTHER PUBLICATIONS

May 15, 2018 International Search Report issued in International Patent Application No. PCT/JP2018/007342.
Oct. 18, 2021 Extended Search Report issued in European Patent Application No. 18908187.0.

* cited by examiner

CELL STACK AND REDOX FLOW BATTERY

TECHNICAL FIELD

The present invention relates to a cell stack and a redox flow battery.

BACKGROUND ART

Patent Documents 1 to 4 describe a cell stack in which a plurality of cell frames, positive electrodes, membranes and negative electrodes are stacked and are sandwiched between end supply/discharge plates, and a redox flow battery using the cell stack. A cell frame includes a bipolar plate that is located between a positive electrode and a negative electrode, and a frame member that supports the bipolar plate from the outer periphery. With this configuration, one cell is formed between bipolar plates of cell frames that are adjacent to each other.

CITATION LIST

Patent Documents

Patent Document 1: JP 2015-122230A
Patent Document 2: JP 2015-122231A
Patent Document 3: JP 2015-138771A
Patent Document 4: JP 2015-210849A

SUMMARY OF INVENTION

The present disclosure is directed to a cell stack including:
a stacked body including a plurality of cell frames each having a bipolar plate whose outer periphery is supported by a frame member; and
a pair of end plates that tighten the stacked body from both sides of a stacking direction thereof, wherein an area S [cm$^2$] of each cell frame as viewed from the stacking direction of the stacked body and a length W [mm] in the stacking direction of the stacked body satisfies a relationship $0.05 \leq W/S \leq 0.9$.

DESCRIPTION OF EMBODIMENTS

Problem to be Solved by the Present Disclosure

Recently, redox flow batteries for storing electric power obtained using natural energy such as wind energy and solar energy have been gaining attention, and there is demand for redox flow batteries with higher power and larger capacity. In order to increase the power of a redox flow battery, it is sufficient to increase the number of cells stacked, that is, the number of cell frames stacked, but this configuration is likely to bend the middle portion of the stacked body, which may possibly cause problems such as leakage of an electrolyte solution and displacement of cell frames.

It is an object of the present disclosure to provide a cell stack and a redox flow battery in which, even when the number of cell frames stacked is increased, problems caused thereby are unlikely to occur.

Description of Embodiments of the Present Disclosure

The inventors conducted an in-depth research on the cause of problems that occur when the number of cell frames stacked is increased. If the number of cell frames stacked is increased, that is, if a length W [mm] in the stacking direction of the stacked body is increased, the middle portion of the stacked body is likely to be bent, and the cell frames may possibly be displaced from each other at the middle portion. In order to suppress bending at the middle portion of the stacked body, it is effective to increase an area S [cm$^2$] of the cell frames as viewed from the stacking direction of the stacked body. However, it is often the case that frame members of such cell frames are resin molded articles produced through injection molding or the like, and thus, if the area S is increased, unevenness is likely to appear in the thickness in the planar direction of the frame members of the cell frames. If there is unevenness in the thickness of the frame members, a gap is likely to be formed between the cell frames that are adjacent to each other, which results in leakage of an electrolyte solution. From these results of the research, the inventors found that it is important to balance a length W in the stacking direction of a stacked body and an area S of each cell frame in order to suppress problems such as leakage. Hereinafter, the content of embodiments of the invention of the present application will be listed and described.

<1> An embodiment is directed to a cell stack, including:
a stacked body including a plurality of cell frames each having a bipolar plate whose outer periphery is supported by a frame member; and
a pair of end plates that tighten the stacked body from both sides of a stacking direction thereof,
wherein an area S [cm$^2$] of each cell frame as viewed from the stacking direction of the stacked body and a length W [mm] in the stacking direction of the stacked body satisfies a relationship $0.05 \leq W/S \leq 0.9$.

As shown in Test Example 1 below, if the W/S is 0.05 or more, it is possible to suppress sealing failures between cell frames that are adjacent to each other, and to suppress leakage from a portion between the cell frames. Furthermore, if the W/S is 0.9 or less, it is possible to suppress displacement of the cell frames.

<2> In the cell stack according to the embodiment, it is possible that the W is 1800 mm or less.

If the length W in the stacking direction of the stacked body is excessively large, a force that tightens the stacked body so as to suppress displacement of the cell frames constituting the stacked body may possibly increase too much. If the tightening force increases, the cell frames may possibly undergo creep deformation depending on the material of the cell frames (frame members), which results in leakage from a portion between the cell frames. On the other hand, if the W is 1800 mm or less, it is easy to suppress creep deformation of the cell frames made of a material that is typically used to form the frame members of the cell frames. It will be appreciated that, if the material of the cell frames is a material that is unlikely to undergo creep deformation, the W may be more than 1800 mm, as long as the relationship $0.05 \leq W/S \leq 0.9$ is satisfied.

<3> In the cell stack according to the embodiment, it is possible that the S is 10000 $cm^2$ or less.

If the area S of the cell frames is excessively large, the volume of the cells in the stacked body increases, and the pressure of the electrolyte solution that flows through the cells may possibly increases too much. If the pressure of the electrolyte solution increases, the cell frames may possibly be cracked, for example depending on the material of the cell frames (frame members), which results in leakage from a portion between the cell frames. On the other hand, if the S is 10000 $cm^2$ or less, it is easy to suppress damage to the cell frames made of a material that is typically used to form the frame members of the cell frames. It will be appreciated that, if the material of the cell frames is a material with high rigidity, the S may be more than 10000 $cm^2$, as long as the relationship $0.05 \leq W/S \leq 0.9$ is satisfied.

<4> In the cell stack according to the embodiment, it is possible that the frame member of each cell frame includes a frame facing surface that faces a frame member of another cell frame adjacent to the cell frame in the stacking direction, and a surface roughness Ra of the frame facing surfaces is 0.03 μm or more and 3.2 μm or less.

If the surfaces of the frame members (frame facing surfaces) of the cell frames stacked one on the other are too smooth, the cell frames that are adjacent to each other may possibly be significantly displaced due to vibrations or shocks when the cell stack is transported to an installation space, the inner pressure of the electrolyte solution when the electrolyte solution is circulated in the cell stack, or the like. If the cell frames that are adjacent to each other are significantly displaced, there may possibly be a problem in that the electrolyte solution circulating in the cell stack leaks to the outside. On the other hand, if the frame members of the cell frames stacked one on the other have too rough surfaces, a large gap is likely to be formed between the frame members, and there may possibly be a problem in that the electrolyte solution circulating in the cell stack leaks to the outside.

Regarding the above-described problems, if the surface roughness Ra of the frame facing surfaces is 0.03 μm or more, the cell frames that are adjacent to each other are unlikely to be displaced when the cell stack is transported or when the electrolyte solution is circulated in the cell stack. Furthermore, if the surface roughness Ra of the frame facing surfaces is 3.2 μm or less, a large gap is unlikely to be formed between the frame members of the cell frames that are adjacent to each other. Accordingly, with the cell stack having the above-described configuration, the electrolyte solution is unlikely to leak to the outside when the electrolyte solution is circulated therein. Note that Ra in this specification is an arithmetic mean roughness as defined by JIS B0601 (2001).

<5> In the cell stack according to the embodiment, it is possible that the frame member has an outer peripheral portion with a predetermined width including an outer peripheral end portion, and the outer peripheral portion includes a thin region whose thickness gradually decreases from a center of the frame member toward the outer peripheral end portion.

In frame members of conventional cell frames, the cross-sections along the thickness direction of the outer peripheral portions are in the shape of rectangles. Accordingly, for example, when a plurality of cell frames are stacked or when the plurality of stacked cell frames are tightened together, a corner portion formed at the outer peripheral end portion of the frame member included in one of the cell frames that are adjacent to each other may damage the frame member of the other cell frame. Since it is often the case that such cell frames of cell stacks are produced through injection molding in which resin is injected into metal dies, the cell frames may possibly be broken due to damage caused by the corner portion described above.

Regarding the above-described problems, with the frame member according to the embodiment <5> above, it is possible to suppress a situation in which, when a plurality of cell frames are stacked or when the stacked cell frames are tightened together, a corner portion of one of the cell frames that are adjacent to each other comes into contact with the frame member of the other cell frame and damages the other cell frame. As a result, it is possible to avoid problems caused by damage to the frame members of the cell frames, such as leakage of an electrolyte solution from a portion between the cell frames that are adjacent to each other, for example. Note that the thin region may be formed around the entire periphery of the outer peripheral portion, or may be formed in part of the outer peripheral portion.

<6> In the cell stack according to the embodiment <5> above, it is possible that, in a cross-section along a thickness direction of the frame member, a cross-sectional shape of the thin region is any one of a pencil-down shape, an R-chamfered shape, and a C-chamfered shape.

With the above-described cross-sectional shape, it is possible to suppress damage to cell frames of a plurality of cell frames stacked one on the other.

<7> In the cell stack according to the embodiment, it is possible that the frame member has a thickness along an axial direction of the frame member, and a length and a width orthogonal to the axial direction and extending at a right angle with each other, and the thickness is shorter than the length and shorter than the width.

In the embodiment <7> above, among the length, the width, and the thickness of the frame member, the thickness is the shortest. If the thickness of the frame member is small, it is possible to suppress a situation in which a cell stack obtained by stacking cell frames each including such a frame member is excessively long. Based on the definition of the length direction, the width direction, and the thickness direction of the frame member, the outer peripheral end portion in the embodiment <5> above is a portion defining an outer peripheral contour when the frame member is viewed from the thickness direction.

<8> In the cell stack according to the embodiment <7> above, it is possible that the length of the frame member is longer than the width of the frame member.

With this configuration, thickness of frame member<width of frame member<length of frame member. It is easy to install the cell stack depending on the shape of the installation space of the cell stack.

<9> In the cell stack according to the embodiment <7> above, it is possible that the length of the frame member is shorter than the width of the frame member.

With this configuration, thickness of frame member<length of frame member<width of frame member. It is easy to install the cell stack depending on the shape of the installation space of the cell stack.

<10> In the cell stack according to the embodiment, it is possible that the thickness of the frame member is 3 mm or more and 10 mm or less.

If the thickness of the frame member is set to the above-described range, it is possible to ensure the rigidity of the frame member.

<11> In the cell stack according to the embodiment, it is possible that, when a pair of the cell frames that are adjacent to each other in the stacking direction are respectively taken as a first cell frame and a second cell frame, and a combination of the first cell frame and the second cell frame is taken as a cell frame pair, in the cell frame pair, an outer peripheral end portion of the frame member included in the first cell frame is shifted from an outer peripheral end portion of the frame member included in the second cell frame, in a direction that intersects the stacking direction, by 0.5 mm or more and 20 mm or less.

It is often the case that frame members including such cell frames are produced through injection molding in which resin is injected into metal dies. However, locally thick portions are likely to be formed near the outer peripheral end portions of the frame members produced through injection molding. The locally thick portions are not portions that are intentionally formed thick, but are portions that are inevitably formed thick due to the characteristics of injection molding, and such thick portions are likely to be formed at similar positions in the frame members. Accordingly, when a plurality of cell frames are stacked and tightened together, the locally thick portions of the frame members overlap each other, and stress is concentrated on the thick portions, which may possibly damage the frame members of the cell frames.

Regarding the above-described problems, with the configuration according to the embodiment <11> above, it is possible to suppress damage to the frame members such as breakage. The reason for this is that, if the cell frames are stacked such that the outer peripheral end portion of the first cell frame and the outer peripheral end portion of the second cell frame are shifted from each other, the locally thick portion in the frame member of the first cell frame and the locally thick portion in the frame member of the second cell frame are shifted from each other in the planar direction.

<12> An embodiment is directed to a redox flow battery including the cell stack according to any one of the embodiments <1> to <11> above.

If the cell stack according to the embodiment is used as a cell stack of a redox flow battery, it is easy to increase the power of the redox flow battery. The reason for this is that, since the cell stack according to the embodiment can suppress problems caused by increasing the number of cell frames stacked, it is possible to increase the power of the redox flow battery by increasing the number of cell frames stacked.

Details of Embodiments of the Present Disclosure

Hereinafter, embodiments of a frame member, a cell frame, and a cell stack of the present disclosure that are constituent elements of a redox flow battery will be described. Note that the invention of the present application is not limited the configurations described in these embodiments, but is defined by the claims, and is intended to encompass all modifications within the meanings and scope that are equivalent to the claims.

Embodiment 1

Figure 1:
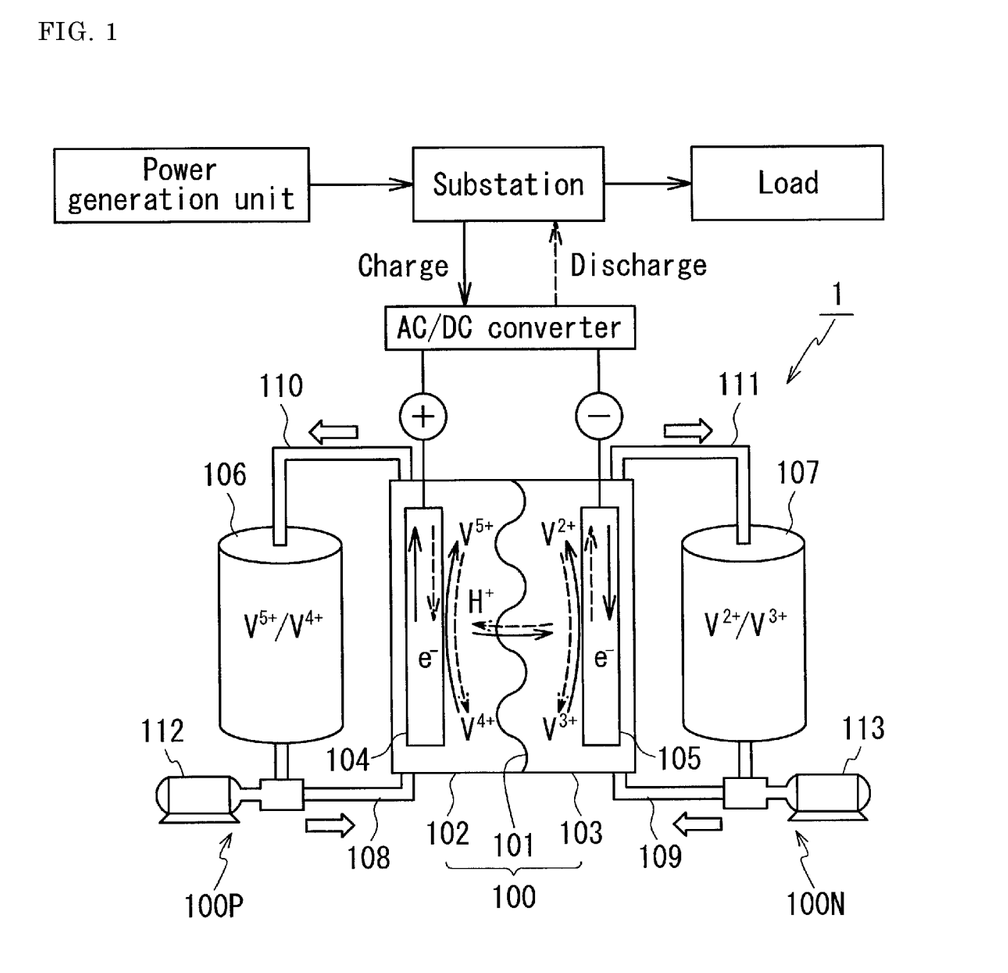
FIG. 1 is an explanatory diagram of an operating principle of a redox flow battery.

Before a description of a cell stack of the embodiment, a basic configuration of a redox flow battery (hereinafter, an RF battery) will be described with reference to FIGS. 1 to 3. Then, the cell stack of the embodiment will be described in detail.

RF Battery

An RF battery is a type of storage cell for circulating an electrolyte solution, and is used to store new energy from solar photovoltaic power generation, wind power generation, and the like. FIG. 1 shows an operating principle of an RF battery 1. The RF battery 1 is a battery that is charged and discharged using the difference between the oxidation-reduction potential of active material ions contained in a positive electrolyte solution and the oxidation-reduction potential of active material ions contained in a negative electrolyte solution. The RF battery 1 includes cells 100 each divided into a positive electrode cell 102 and a negative electrode cell 103 by a membrane 101 that is permeable to hydrogen ions.

The positive electrode cell 102 accommodates a positive electrode 104, and is connected via pipes 108 and 110 to a positive electrolyte solution tank 106 for storing a positive electrolyte solution. The pipe 108 is provided with a pump 112, and a positive electrode circulation mechanism 100P for circulating a positive electrolyte solution is constituted by these constituent elements 106, 108, 110, and 112. In a similar manner, the negative electrode cell 103 accommodates a negative electrode 105, and is connected via pipes 109 and 111 to a negative electrolyte solution tank 107 for storing a negative electrolyte solution. The pipe 109 is provided with a pump 113, and a negative electrode circulation mechanism 100N for circulating a negative electrolyte solution is constituted by these constituent elements 107, 109, 111, and 113. The electrolyte solutions stored in the tanks 106 and 107 are circulated in the cells 102 and 103 by the pumps 112 and 113 when performing charge/discharge. When charge/discharge is not performed, the pumps 112 and 113 are stopped, and the electrolyte solutions are not circulated.

Figure 2:
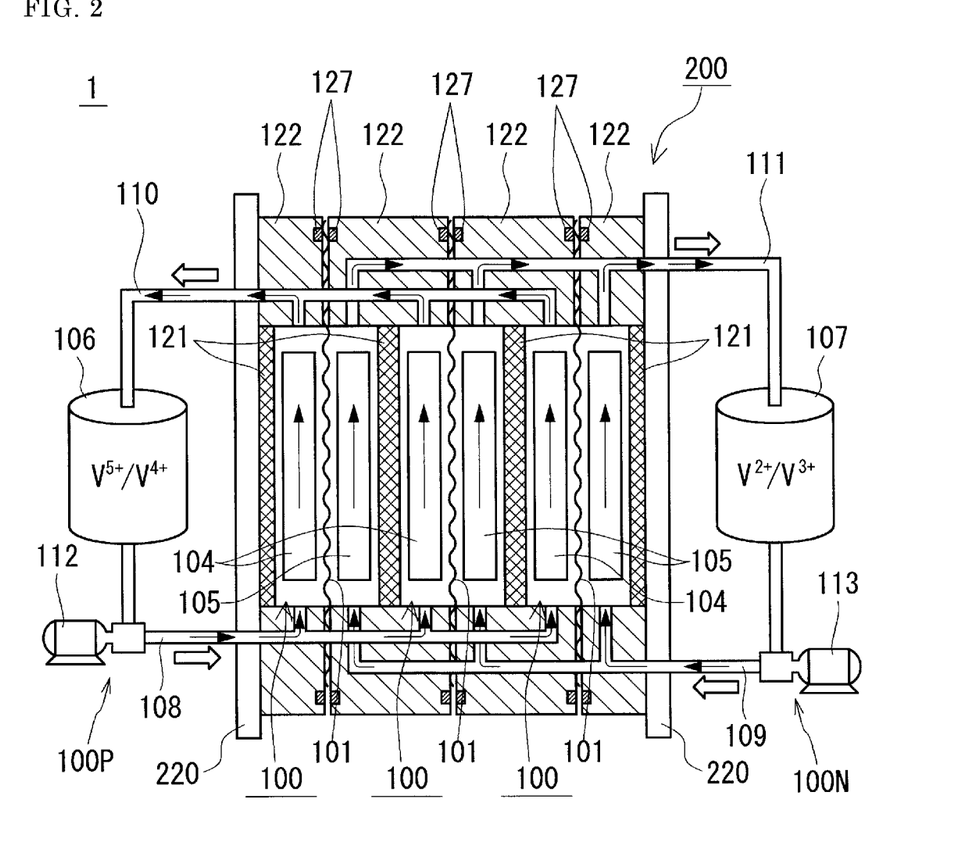
FIG. 2 is a schematic configuration diagram of the redox flow battery.

As shown in FIG. 2, the cells 100 are used typically in the form of a cell stack 200 in which a stacked body formed by stacking a plurality of cell frames 120 (see FIG. 3), positive electrodes 104, membranes 101, and negative electrodes 105 is tightened by a pair of end plates 220 in the stacking direction.

Figure 3:
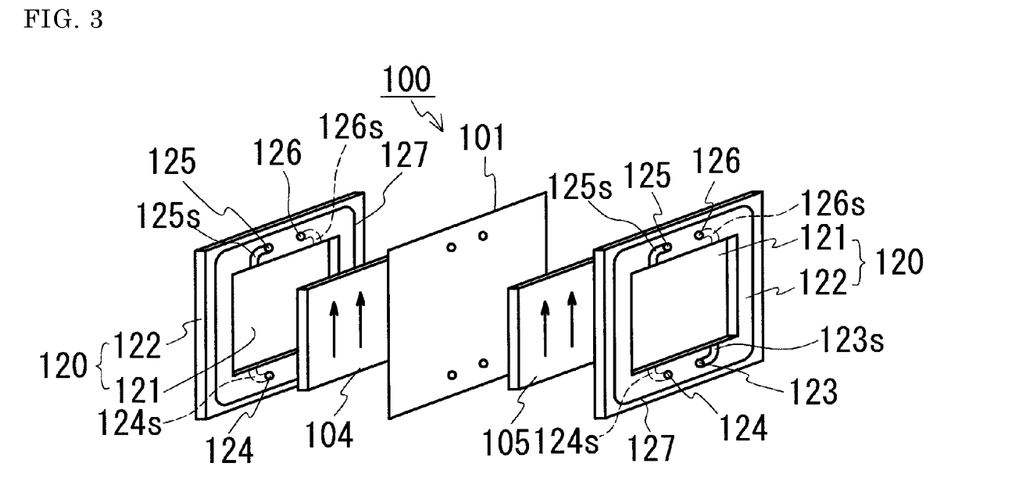
FIG. 3 is a schematic configuration diagram of a cell of the redox flow battery.

As shown in FIG. 3, each cell frame 120 has a frame member 122 that has a through window, and a bipolar plate 121 that blocks the through window. That is to say, the frame member 122 supports the bipolar plate 121 from the outer peripheral side. Such a cell frame 120 can be produced, for example, by molding a frame member 122 in one piece with the outer peripheral portion of a bipolar plate 121 (see FIG. 2 as well). Alternatively, the cell frame 120 can be produced by preparing a frame member 122 in which a portion near the outer periphery of the through window is formed thin, and a bipolar plate 121 produced separately from the frame member 122, and fitting the outer peripheral portion of the bipolar plate 121 to the thin portion of the frame member 122. In this case, the bipolar plate 121 may be either merely placed on the frame member 122 or bonded thereto. The positive electrode 104 is arranged in contact with one face of the bipolar plate 121 of the cell frame 120, and the negative electrode 105 is arranged in contact with the other face of the bipolar plate 121. With this configuration, one cell 100 is formed between the bipolar plates 121 fitted to the cell frames 120 that are adjacent to each other.

The electrolyte solution is caused to flow to the cell 100 by supply manifolds 123 and 124 and discharge manifolds 125 and 126 formed in the cell frame 120. The positive electrolyte solution is supplied from the supply manifold 123 via an inlet slit 123s formed on the one face side (the front side in the section of the diagram) of the cell frame 120 to the positive electrode 104, and is discharged via an outlet slit 125s formed in the upper portion of the cell frame 120 to the discharge manifold 125. In a similar manner, the negative electrolyte solution is supplied from the supply manifold 124 via an inlet slit 124s formed on the other face side (the back side in the section of the diagram) of the cell frame 120 to the negative electrode 105, and is discharged via an outlet slit 126s formed in the upper portion of the cell frame 120 to the discharge manifold 126. Ring-like sealing members 127 such as O rings or flat packings are arranged between the cell frames 120, and leakage of an electrolyte solution is suppressed between the cell frames 120.

Cell Stack of Embodiment

Figure 4:
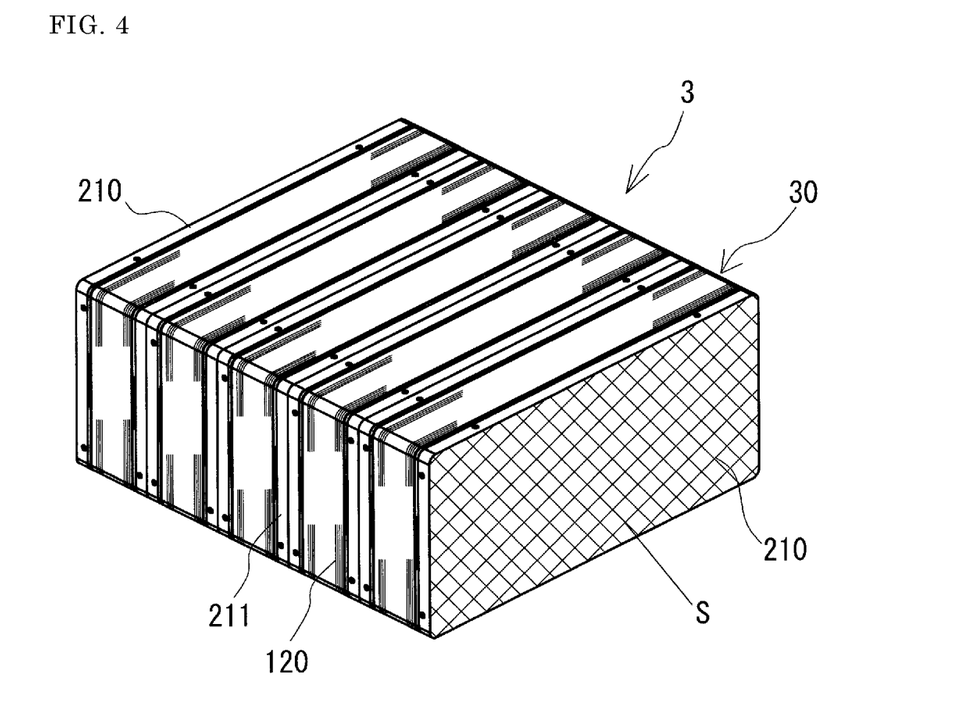
FIG. 4 is a schematic perspective view of a cell stack according to Embodiment 1.
Figure 5:
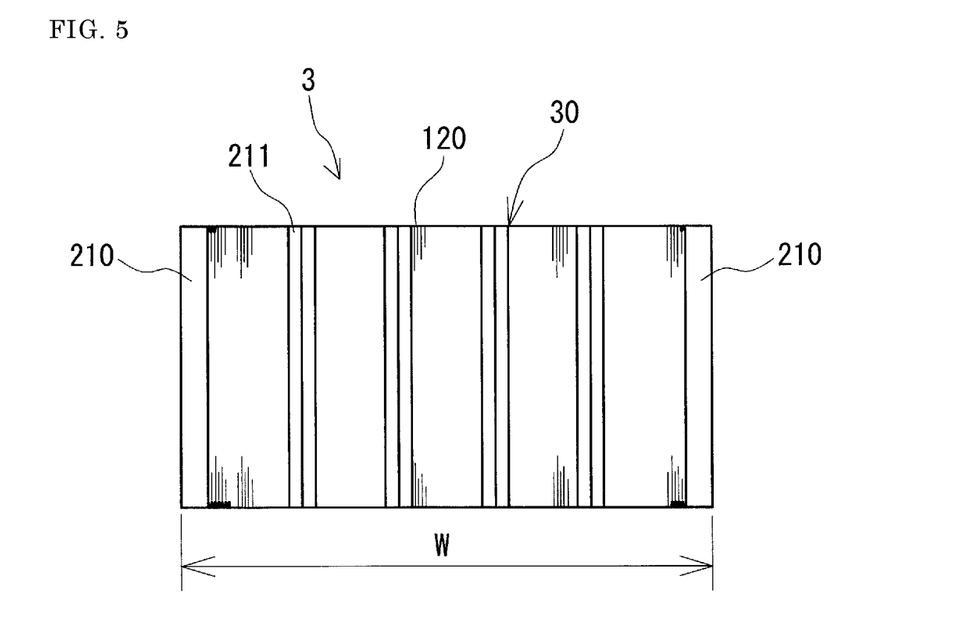
FIG. 5 is a schematic side view of the cell stack according to Embodiment 1.

Hereinafter, a cell stack 3 according to the embodiment will be described based on the basic configuration of the RF battery 1 described above with reference to FIGS. 4 and 5. In FIGS. 4 and 5, the end plates 220 shown in FIG. 2 are not shown.

The cell stack 3 in FIGS. 4 and 5 includes a stacked body 30 formed by stacking a plurality of cell frames 120. The stacked body 30 of this example includes end supply/discharge plates 210 and middle supply/discharge plates 211, but the middle supply/discharge plates 211 do not have to be included. As shown in FIG. 18 of Patent Document 1 and the like, the supply/discharge plates 210 and 211 are members through which an electrolyte solution flows from the outside of the cell stack 3 into the cell 100 (FIG. 3)

The cell stack 3 of this example is characterized in that W/S, which is a ratio between a length W [mm] in the stacking direction of the stacked body 30 and an area S [cm$^2$] of each cell frame 120 oriented in the stacking direction of the stacked body 30, is within a predetermined range. The area S of the cell frame 120 is an area that is on the inner side of the outer peripheral contour of the frame member 122 included in the cell frame 120, and also includes the area of the bipolar plate 121 exposed from the frame member 122 (FIG. 3). In this example, the shape of the end supply/discharge plates 210 as viewed from the stacking direction of the stacked body 30 is substantially the same as that of the cell frames 120. Accordingly, the area on one face side of the end supply/discharge plate 210 indicated by the cross-hatched portion in FIG. 4 may be considered as being equal to that of the area S of the cell frames 120. Meanwhile, as shown in FIG. 5, the length W of the stacked body 30 is a length between the outer face of an end supply/discharge plate 210 arranged at one end of the stacked body 30 and the outer face of an end supply/discharge plate 210 arranged at the other end.

If the area S of the cell frames 120 is increased, the unevenness of the in-plane thickness of the cell frame 120 is likely to increase, and sealing failures are likely to occur between the cell frames 120. The sealing failures decrease in accordance with an increase in the length W of the stacked body 30 and an increase in the number of cell frames 120 stacked. The reason for this is that an increase in the number of cell frames 120 stacked reduces the influence of the unevenness of the in-plane thickness of each cell frame 120 affecting the stacked body 30. However, if the number of cell frames 120 stacked is increased too much, the middle portion of the stacked body 30 is likely to be bent, and the cell frames 120 are likely to be displaced. In this manner, in order to suppress various problems that occur in the stacked body 30 when the area S is increased in order to increase the capacity of the RF battery 1 (FIG. 1) or when the length W is increased in order to increase the output, it is important to balance the area S and the length W.

Specifically, the W/S is 0.05 or more and 0.9 or less. If the W/S is 0.05 or more, it is possible to suppress sealing failures between cell frames 120 that are adjacent to each other, and to suppress leakage from a portion between the cell frames 120. The reason for this is that, since the area S is not excessively large relative to the length W, the influence of the unevenness of the in-plane thickness of the frame member 122 in each cell frame 120 is small. Furthermore, if the W/S is 0.9 or less, it is possible to suppress bending at the middle portion of the stacked body 30 and thus displacement of the cell frames 120. The reason for this is that the length W is not excessively large relative to the area S. It is preferable that the W/S is 0.1 or more and 0.8 or less.

There is no particular limitation on the length W of the stacked body 30, as long as $0.05 \leq W/S \leq 0.9$ or less is satisfied. However, if the length W is excessively large, a force that tightens the stacked body 30 so as to suppress displacement of the cell frames 120 and the supply/discharge plates 210 and 211 constituting the stacked body 30 increases. If the tightening force increases, the frame members 122 may possibly undergo creep deformation depending on the material of the frame members 122 of the cell frames 120 (FIG. 3), which results in leakage from a portion between the cell frames 120. Accordingly, it is preferable that the length W is 1800 mm or less. If the length W is 1800 mm or less, it is easy to suppress creep deformation of the cell frames 120 made of a material that is typically used to form the frame members 122 of the cell frames 120. It is more preferable that the upper limit value of the length W is 1700 mm or less.

It is preferable that the lower limit value of the length W is 100 mm. The reason for this is that the length W correlates with the number of cell frames 120 stacked, that is, the number of the cells 100 (FIGS. 2 and 3) connected in series. If the length W is 100 mm or more, the number of the cells 100 connected in series can be increased, and thus an RF battery 1 (FIG. 1) with sufficient power can be obtained. In order to increase the output of the RF battery 1, the length W is preferably 200 mm or more. The reason for this is that the greater the length W is, the larger the number of cell frames 120 stacked is. Since a typical cell frame 120 has a thickness of approximately 3 mm or more and 10 mm or less (or 5 mm or more and 8 mm or less), the number of cell frames 120 stacked can be obtained through calculation from the length W and the thickness of each cell frame 120. Note that the stacked body 30 includes the supply/discharge plates 210 and 211, and thus it is necessary to calculate the number of cell frames 120 stacked after subtracting the thickness of the supply/discharge plates 210 and 211 from the length W.

There is no particular limitation on the area S of the cell frames 120, as long as $0.05 \leq W/S \leq 0.9$ or less is satisfied. However, if the area S is excessively large, the volume of the cells 100 (FIGS. 2 and 3) in the stacked body 30 increases, and the pressure of the electrolyte solution that flows through the cells 100 may possibly increase too much. If the pressure of the electrolyte solution increases, the frame members 122 may possibly be cracked, for example, depending on the material (rigidity) of the frame members 122 of the cell frames 120 (FIG. 3), which results in leakage from a portion between the cell frames 120. Accordingly, it is preferable that the area S is 10000 cm$^2$ or less. If the area S is 10000 cm$^2$ or less, it is easy to suppress damage to the cell frames 120 made of a material that is typically used to form the frame member 122. It is more preferable that the upper limit value of the area S is 9000 cm$^2$ or less.

It is preferable that the lower limit of the area S is 500 cm$^2$. The reason for this is that the area S correlates with the size of the bipolar plates 121 of the cell frames 120, that is, the capacity of the RF battery 1 (FIG. 1). If the area S is 500 cm$^2$ or more, the size of the bipolar plates 121 can be increased, and thus an RF battery 1 (FIG. 1) with sufficient capacity can be obtained. In order to increase the capacity of the RF battery 1, the area S is preferably 1000 cm$^2$ or more.

Embodiment 2

In Embodiment 2, a cell stack in which the surface roughness of a frame member 22 of a cell frame 2 is set to a predetermined value will be described with reference to FIG. 6.

Figure 6:
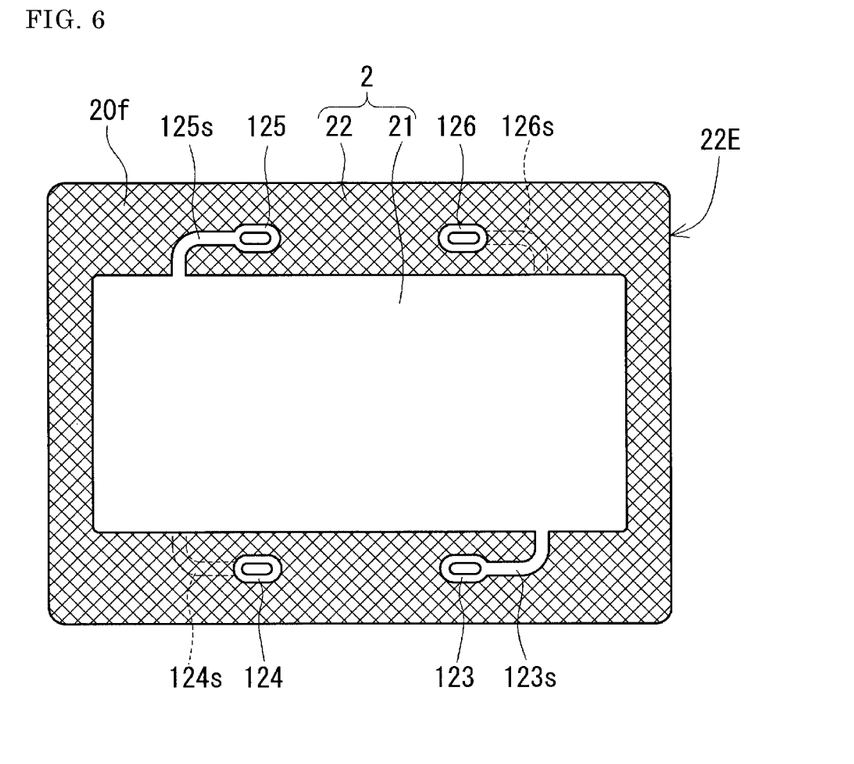
FIG. 6 is a plan view of a cell frame that is used in a cell stack according to Embodiment 2.

The cell frame 2 of this example shown in FIG. 6 includes a bipolar plate 21 and a frame member 22 as in the case of a conventional cell frame 120 (FIG. 3). The supply manifolds 123 and 124 are arranged in the frame piece in the lower section of the diagram of the frame member 22, and the discharge manifolds 125 and 126 are arranged in the frame piece in the upper section of the diagram. That is to say, in the cell frame 2 in FIG. 6, the direction from the lower side to the upper side in the section of the diagram is the direction in which the electrolyte solution flows, and the cell frame 2 is a horizontally long cell frame 2 in which the length in the direction that is orthogonal to the flow direction is longer than the length in the flow direction.

The frame member 22 of the cell frame 2 has a frame facing surface 20$f$ (see the cross-hatched portion) that faces a frame member 22 of another cell frame 2 when the cell frames 2 are stacked. The frame facing surface 20$f$ is a portion of the cell frame 2 excluding the manifolds 123 to 126 and the slits 123$s$ to 126$s$. In this example, as measures against leakage of an electrolyte solution from the cell stack 3, a surface roughness Ra (arithmetic mean roughness as defined by JIS B0601:2001) of the frame facing surface 20$f$ is set to 0.03 μm or more and 3.2 μm or less. The surface roughness Ra can be obtained by measuring the roughness at ten or more regions on the frame facing surface 20$f$ using a commercially available measuring device and averaging the measurement results.

If the surface roughness Ra of the frame facing surfaces 20$f$ is 0.03 μm or more, an appropriate frictional force is generated between the frame facing surfaces 20$f$ of the cell frames 2 stacked one on the other. As a result, the cell frames 2 that are adjacent to each other are unlikely to be displaced when the cell stack 3 (FIGS. 4 and 5) is transported or when the electrolyte solution is circulated in the cell stack 3. Furthermore, if the surface roughness Ra of the frame facing surfaces 20$f$ is 3.2 μm or less, a large gap is unlikely to be formed between the frame members 22 of the cell frames 2 that are adjacent to each other. Accordingly, if the cell stack 3 is produced using the cell frames 2 including the frame facing surfaces 20$f$ with a surface roughness Ra of 0.03 μm or more and 3.2 μm or less, the electrolyte solution is unlikely to leak from the cell stack 3 when the electrolyte solution is circulated in the cell stack 3. The surface roughness Ra of the frame facing surfaces 20$f$ is preferably 0.03 μm or more and 3.2 μm or less, and more preferably 0.05 μm or more and 1.5 μm or less.

Embodiment 3

In Embodiment 3, a cell stack 3 including cell frames 2 each having a frame member 22 whose outer peripheral portion with a predetermined width including an outer peripheral end portion 22E is provided with a thin region 22R will be described with reference to FIGS. 7A to 7F. FIGS. 7A to 7F are partial vertical cross-sectional views (cross-sectional views along the thickness direction of the frame members 22) of the cell stack 3.

As shown in FIGS. 7A to 7F, the thin region 22R is a region whose thickness gradually decreases from the center of the frame member 22 toward the outer peripheral end portion 22E. If the frame members 22 are provided with such thin regions 22R, it is possible to suppress a situation in which, when a plurality of cell frames 2 are stacked or when the stacked cell frames 2 are tightened together, a corner portion of the outer peripheral end portion 22E of the frame member 22 included in one of the cell frames 2 that are adjacent to each other comes into contact with the frame member 22 of the other cell frame 2 and damages the other cell frame 2. As a result, it is possible to avoid problems caused by damage to the frame members 22 of the cell frames 2, such as leakage of an electrolyte solution from a portion between the cell frames 2 that are adjacent to each other, for example.

Figure 7A:
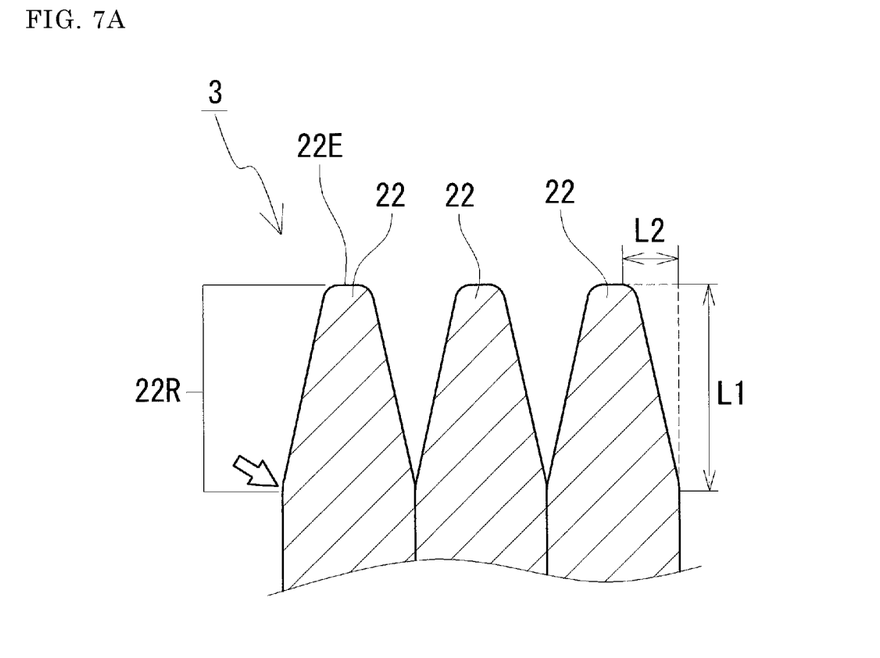
FIG. 7A is a partial vertical cross-sectional view of a cell stack according to Embodiment 3.

There is no particular limitation on the cross-sectional shape of each thin region 22R, as long as it is a shape whose thickness gradually decreases toward the outer peripheral end portion 22E. In FIG. 7A, the thin region 22R is formed so as to have a cross-sectional shape that is an elongated isosceles trapezoid. It is preferable that the portion (see the outlined arrow) connecting the thin region 22R and the flat face portion is a curved face (a curved line in the cross-section). The cross-sectional shape of the thin region 22R of this example is a shape in which the end of the isosceles trapezoid is rounded, that is, a so-called pencil-down shape. Accordingly, a length L1 from the start position of the thin region 22R in the direction along the flat face of the cell frame 2 to the outer peripheral end portion 22E is longer than a length L2 from the outer peripheral end portion 22E in the thickness direction of the cell frame 2 to a virtual face obtained by extending the flat face of the cell frame 2. The length L1 is, for example, preferably 1 mm or more and 30 mm or less, and more preferably 5 mm or more and 10 mm or less. Furthermore, there is no particular limitation on the length L2, as long as it is ½ or less of the thickness of the cell frame 2, and the length L2 is, for example, preferably 0.1 mm or more and 2.5 mm or less, and more preferably 1 mm or more and 1.5 mm or less.

Figure 7B:
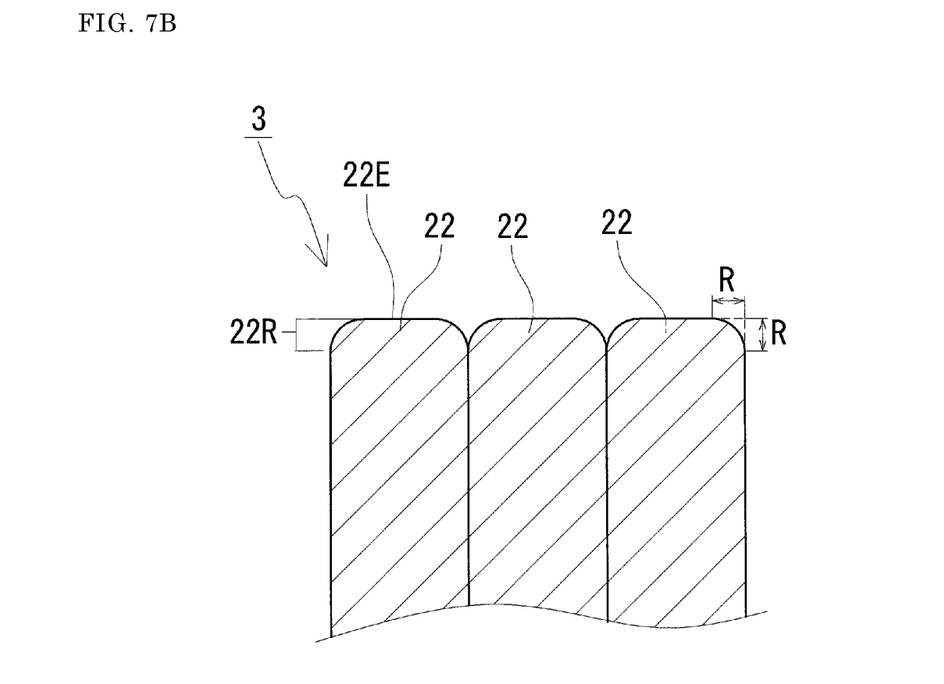
FIG. 7B is a partial vertical cross-sectional view of a cell stack different from that in FIG. 7A.

In the example shown in FIG. 7B, the thin region 22R is formed so as to have a cross-sectional shape that is a rectangle whose corner portions (see the dot lines) are R-chamfered. There is no particular limitation on the chamfer radius R, as long as it is ½ or less of the thickness of the cell frame 2. For example, the chamfer radius R is preferably 0.1 mm or more and 2.5 mm or less, and more preferably 1.0 mm or more and 1.5 mm or less.

Figure 7C:
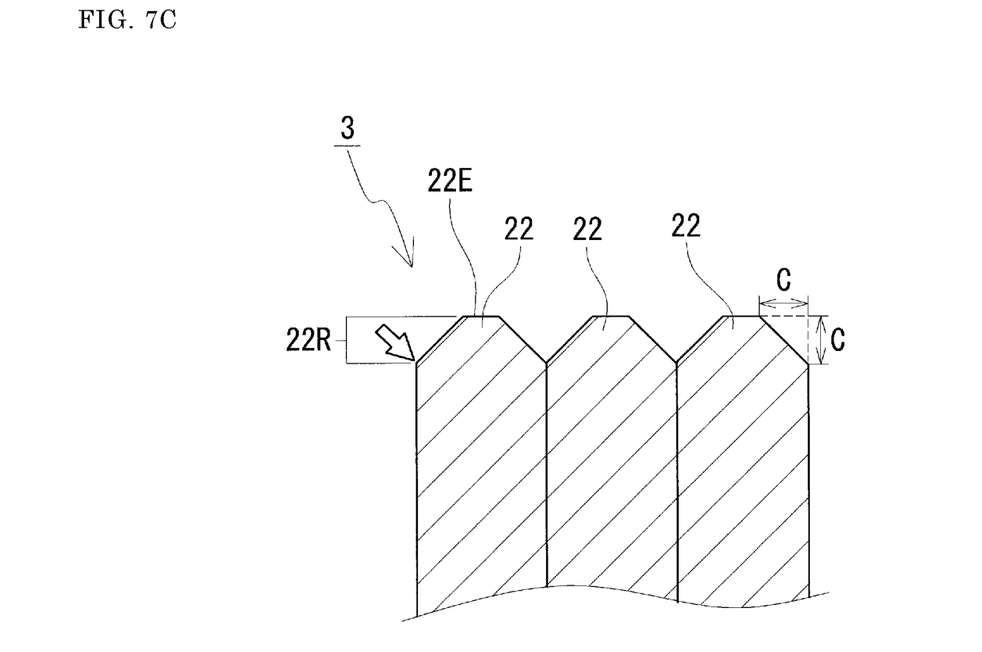
FIG. 7C is a partial vertical cross-sectional view of a cell stack different from those in FIGS. 7A and 7B.

In the example shown in FIG. 7C, the thin region 22R is formed so as to have a cross-sectional shape that is a rectangle whose corner portions (see the dot lines) are C-chamfered. It is preferable that the portion (see the outlined arrow) connecting the thin region 22R and the flat face portion is a curved face (a curved line in the cross-section). There is no particular limitation on the chamfer length C, as long as it is ½ or less of the thickness of the cell frame 2. For example, the chamfer length C is preferably 0.1 mm or more and 2.5 mm or less, and more preferably 1.0 mm or more and 1.5 mm or less.

Figure 7D:
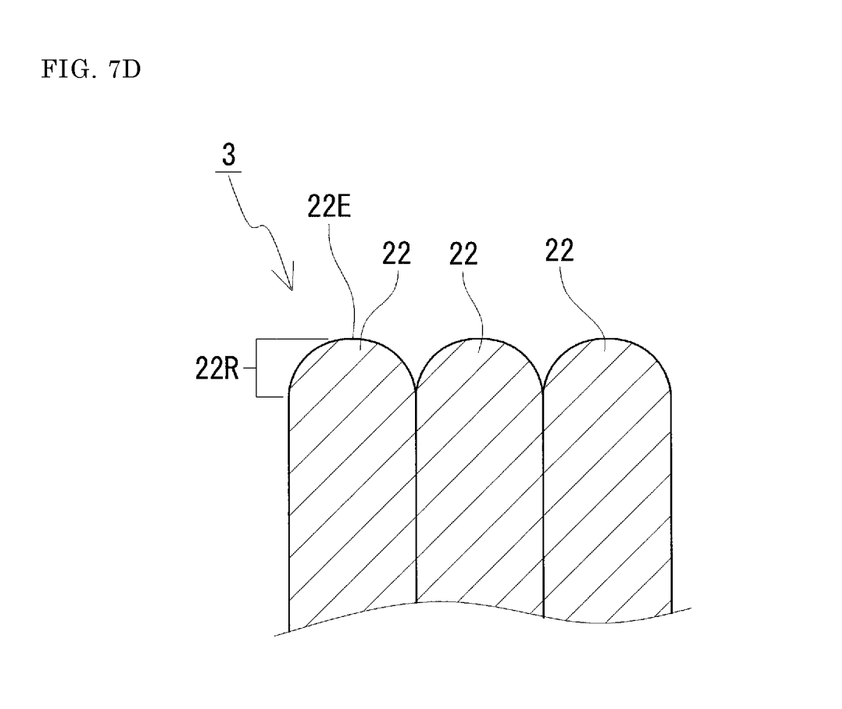
FIG. 7D is a partial vertical cross-sectional view of a cell stack different from those in FIGS. 7A to 7C.

In the example shown in FIG. 7D, the thin region 22R is formed so as to have a cross-sectional shape that is a semicircle (i.e., a curved line). Also with this configuration, it is possible to suppress a situation in which the connecting portion of one of the cell frames 2 that are adjacent to each other damages the other cell frame 2.

The cross-sectional shape of the thin region 22R is not limited to a semicircular shape, as long as the cross-sectional shape is constituted only by a curved line. For example, the cross-sectional shape may be the shape of a semi-ellipse, or may be a shape obtained by rounding the straight line portions of the isosceles trapezoid in FIG. 7A.

Figure 7E:
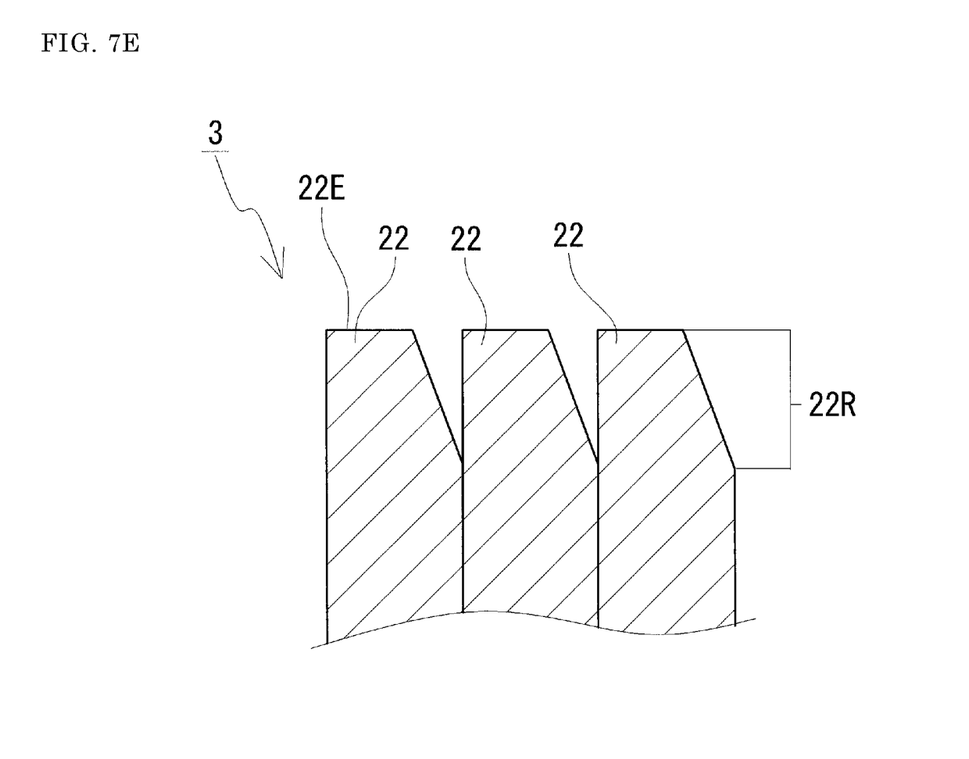
FIG. 7E is a partial vertical cross-sectional view of a cell stack different from those in FIGS. 7A to 7D.

In the example shown in FIG. 7E, the thin region 22R is formed such that only on one face side of the outer peripheral portion of the frame member 22 of the cell frame 2 is inclined in the thickness direction. Accordingly, the thin region 22R is formed so as to have a cross-sectional shape that is a right-angled trapezoid. Also with this configuration, it is possible to suppress damage to the cell frames 2 that are adjacent to each other.

Figure 7F:
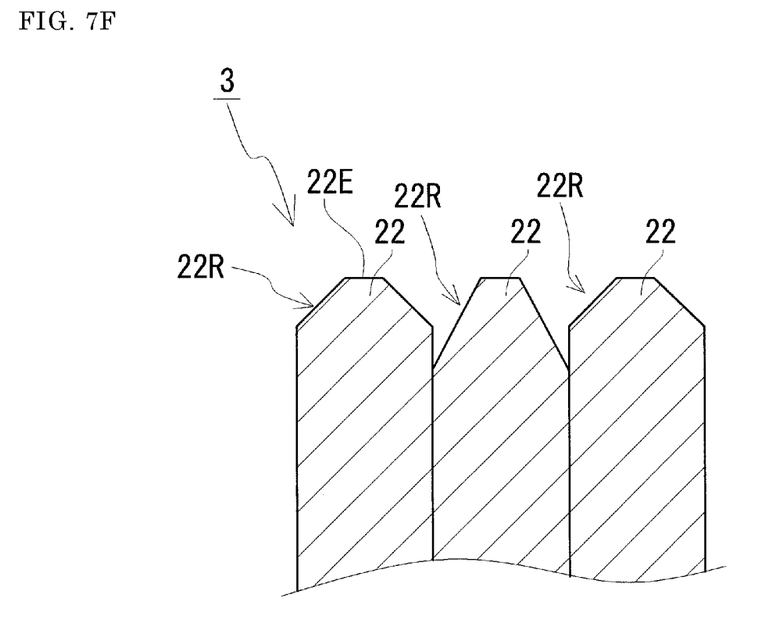
FIG. 7F is a partial vertical cross-sectional view of a cell stack different from those in FIGS. 7A to 7E.

As shown in FIG. 7F, the thin regions 22R of the cell frames 2 that are adjacent to each other may be formed with different widths. In this example, the left and right cell frames 2 have thin regions 22R in the shape of isosceles trapezoids with a small height and the middle cell frame 2 has a thin region 22R in the shape of an isosceles trapezoid with a large height, but the combination is not limited to this.

Embodiment 4

Figure 8:
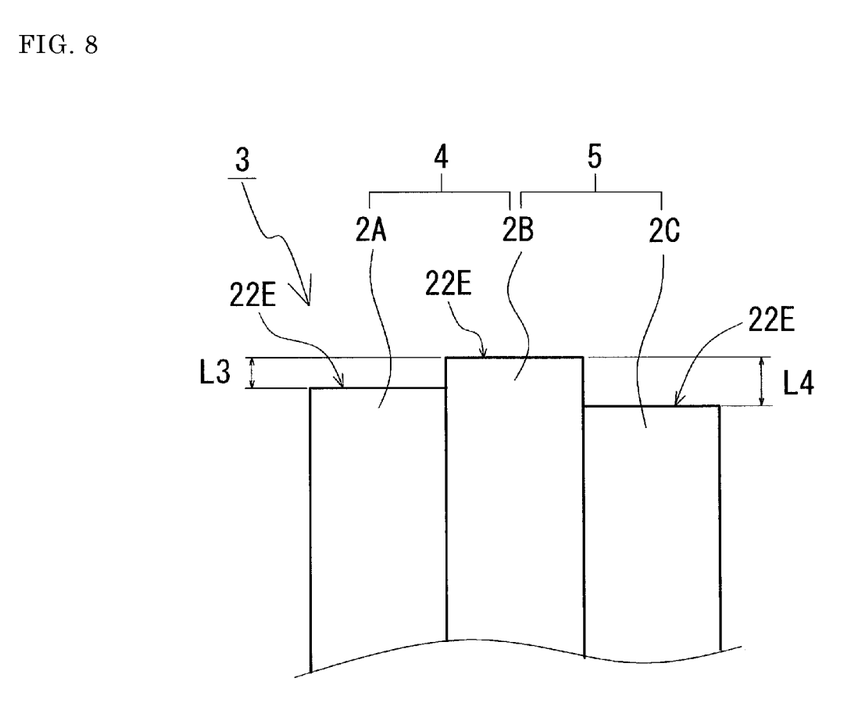
FIG. 8 is a partial vertical cross-sectional view of a cell stack according to Embodiment 4.

In Embodiment 4, a cell stack 3 in which outer peripheral end portions 22E of cell frames 2A and 2B (2B and 2C) that are adjacent to each other are shifted from each other will be described with reference to FIG. 8. FIG. 8 is a partial vertical cross-sectional view of the cell stack 3.

In FIG. 8, a cell frame pair 4 is constituted by the cell frame 2A (first cell frame) and the cell frame 2B (second cell frame), and a cell frame pair 5 is constituted by the cell frame 2B (first cell frame) and a cell frame 2C (second cell frame). As shown in FIG. 8, in the cell frame pair 4, the outer peripheral end portion 22E in the frame member 22 of the first cell frame 2A and the outer peripheral end portion 22E in the frame member 22 of the second cell frame 2B are shifted from each other by a length L3. Furthermore, in the cell frame pair 5, the outer peripheral end portion 22E of the frame member 22 of the first cell frame 2B and the outer peripheral end portion 22E of the second cell frame 2C are shifted from each other by a length L4. In this manner, the shift amounts (the lengths L3 and L4) in the different cell frame pairs 4 and 5 may be different from each other.

The shift amounts (the lengths L3 and L4) between the outer peripheral end portions 22E are 0.5 mm or more and 20 mm or less. If the shift amounts between the outer peripheral end portions 22E are 0.5 mm or more, the locally thick portion in the frame member 22 in the cell frame 2A (2B) and the locally thick portion in the frame member 22 in the cell frame 2B (2C) are shifted from each other in the planar direction of the cell frames 2A and 2B (2B and 2C). As a result, excessive stress is unlikely to be applied to the locally thick portions in the frame members 22 of the cell frames 2A, 2B, and 2C when they are tightened, and problems such as breakage are unlikely to occur in these portions. Meanwhile, if the shift amounts between the outer peripheral end portions 22E are 20 mm or less, the manifolds 123 to 126 (FIG. 4, etc.) of the cell frames 2A and 2B (2B and 2C) that are adjacent to each other are shifted from each other, and thus the manifolds 123 to 126 are not blocked. The shift amounts between the outer peripheral end portions 22E are preferably 0.8 mm or more and 10 mm or less, and more preferably 1.2 mm or more and 5 mm or less.

In FIG. 8, only the two cell frame pairs 4 and 5 were described, but, in this example, outer peripheral end portions 22E of a first cell frame and a second cell frame are shifted from each other in all cell frame pairs included in the cell stack 3. With this configuration, it is possible to suppress a situation in which excessive stress locally acts on any cell frames included in the cell stack 3. Contrary to this example, also with a configuration in which outer peripheral end portions 22E of a first cell frame and a second cell frame are shifted from each other in some of the cell frame pairs, it is possible to suppress a situation in which excessive stress acts on the cell frames. It is preferable that the maximum shift amount in all cell frames included in the cell stack 3 is 20 mm or less. The maximum shift amount is a shift amount between a cell frame that is at the lowest position and a cell frame that is at the highest position in all cell frames.

Others

In the example shown in FIG. 8, the state was described in which two adjacent cell frames are shifted from each other in the upper-lower direction (the length direction along the vertical direction) with respect to the installation face on which the cell stack is installed, but it is also possible that the cell frames are shifted from each other in the left-right direction (the width direction). Furthermore, it is also possible that two adjacent cell frames are shifted from each other both in the upper-lower direction and the left-right direction with respect to the installation face. In this case, each of a shift amount in the upper-lower direction and a shift amount in the left-right direction is 0.5 mm or more and 20 mm or less.

Also, as a configuration in which locally thick portions of a first cell frame and a second cell frame that are adjacent to each other are shifted from each other in the planar direction of the cell frames, it is also possible that the size of the frame member included in the first cell frame and the size of the frame member included in the second cell frame are different from each other. If the cell frames including the frame members with different sizes are stacked, the outer peripheral end portion of the frame member included in the first cell frame and the outer peripheral end portion of the frame member included in the second cell frame are shifted from each other as viewed from a direction that is orthogonal to the stacking direction, and the locally thick portion in the frame member of the first cell frame and the locally thick portion in the frame member of the second cell frame are shifted from each other in the planar direction of the cell frames.

Embodiment 5

Figure 9:
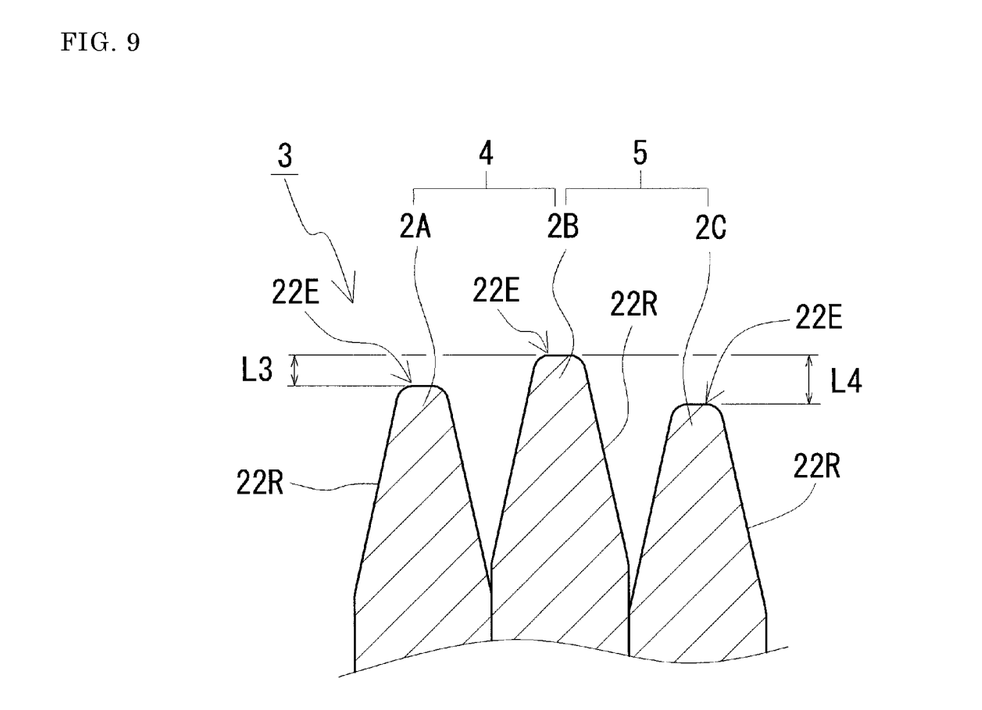
FIG. 9 is a partial vertical cross-sectional view of a cell stack according to Embodiment 5.

In Embodiment 5, a cell stack 3 obtained by combining the configuration of Embodiment 3 and the configuration of Embodiment 4 will be described with reference to FIG. 9. FIG. 9 is a partial vertical cross-sectional view of the cell stack 3 of Embodiment 5.

As shown in FIG. 9, in the cell stack 3 of this example, not only that the outer peripheral end portions 22E of the cell frames 2A and 2B (2B and 2C) that are adjacent to each other are shifted from each other, but also that the thin regions 22R are formed in the frame members 22 of the cell frames 2A, 2B, and 2C. With this configuration, it is possible to suppress a situation in which excessive stress is applied by the corner portions of the outer peripheral end portions 22E of the frame members 22 to the cell frames 2A, 2B, and 2C that are adjacent to each other. In the example shown in FIG. 9, the cross-sectional shape of the thin regions 22R is a pencil-down shape, but it may be an R-chamfered shape or a C-chamfered shape, for example.

Test Example 1

In Test Example 1, test pieces Nos. 1 to 16 were produced in which the length W of the stacked body 30 shown in FIG. 5 and the area S of the cell frames 120 shown in FIG. 4 were variously changed. In each test piece, whether or not leakage occurred, whether or not the cell frames 120 were displaced, whether or not creep deformation occurred, and whether or not damage due to liquid pressure occurred were checked. Table 1 shows the measurement results together with the length W, the area S, and the W/S of each test piece.

As shown in Table 1, in the test pieces Nos. 1 to 11 with a W/S of 0.05 or more and 0.9 or less, a length W of 1800 mm or less, and an area S of 10000 cm² or less, there was no problem. On the other hand, in the test pieces Nos. 13 and 14 with a W/S of less than 0.05, the cell frames 120 were not displaced, but leakage occurred. Furthermore, in the test piece No. 12 with a W/S of more than 0.9, leakage did not occur, but the cell frames 120 were displaced. It is seen from these results that it is important to set the W/S to 0.05 or more and 0.9 or less in order to suppress leakage from the stacked body 30 and displacement of the cell frames 120.

In the test piece No. 15 with a W/S of 0.05 or more and 0.9 or less but with a length W of more than 1800 mm, leakage did not occur and the cell frames 120 were not displaced immediately after circulation of an electrolyte solution was started. However, creep deformation occurred in the cell frames 120 of the test piece No. 15, and thus there

TABLE 1

|  |  | 1 | 2 | 3 | 4 | 5 | 6 | 7 | 8 | 9 | 10 |
|---|---|---|---|---|---|---|---|---|---|---|---|
| S | (cm²) | 1000 | 1000 | 1000 | 2000 | 2000 | 2000 | 5000 | 5000 | 8000 | 8000 |
| W | (mm) | 125 | 300 | 800 | 250 | 600 | 1600 | 400 | 1000 | 700 | 1000 |
| W/S |  | 0.13 | 0.30 | 0.80 | 0.13 | 0.30 | 0.80 | 0.08 | 0.20 | 0.09 | 0.13 |
| Leakage |  | None | None | None | None | None | None | None | None | None | None |
| Displacement of cell frame |  | None | None | None | None | None | None | None | None | None | None |
| Creep deformation |  | None | None | None | None | None | None | None | None | None | None |
| Liquid pressure damage |  | None | None | None | None | None | None | None | None | None | None |

|  |  | 11 | 12 | 13 | 14 | 15 | 16 |
|---|---|---|---|---|---|---|---|
| S | (cm²) | 1500 | 1000 | 2000 | 5000 | 5000 | 11000 |
| W | (mm) | 830 | 1300 | 60 | 200 | 1900 | 1000 |
| W/S |  | 0.55 | 1.30 | 0.03 | 0.04 | 0.38 | 0.09 |
| Leakage |  | None | None | Occurred | Occurred | None | None |
| Displacement of cell frame |  | None | Occurred | None | None | None | None |
| Creep deformation |  | None | None | None | None | Occurred | None |
| Liquid pressure damage |  | None | None | None | None | None | Occurred |

Whether or not leakage occurred in each test piece in Table 1 was determined based on whether or not, when He gas was caused to flow into the electrolyte solution path of the cell stack, the He leaked to the outside of the stacked body 30 without mechanical deformation or damage to the cell frames 120. The sensitivity for measuring He was $10^{-4}$ Pa·m³/s or more. Whether or not the cell frames 120 were displaced in each test piece was determined based on whether or not, when the test piece was lifted and vibrated, any cell frame 120 was displaced by 0.5 mm or more at any position in the stacked body 30. Whether or not creep deformation (room temperature) occurred was determined based on whether or not, when the stacked body 30 was tightened to the level that allows the test piece to be lifted, and then the stacked body 30 was disassembled after the elapse of a predetermined period of time, creep deformation occurred in the cell frames 120. Whether or not liquid pressure damage occurred in each test piece was determined based on whether or not, when an electrolyte solution was circulated in the test piece at a liquid pressure of 300 kPa or more, any cell frame 120 (any frame member 122) was broken. The liquid pressure 300 kPa is the pressure that is slightly larger than that when RF batteries 1 are ordinarily operated.

is a possibility that leakage occurred when circulation of an electrolyte solution was continued. Furthermore, in the test piece No. 16 with a W/S of 0.05 or more and 0.9 or less but with an area S of more than 10000 cm², leakage did not occur and the cell frames 120 were not displaced immediately after circulation of an electrolyte solution was started. However, in the cell frames 120 of the test piece No. 16, when the flow rate of the electrolyte solution increased, liquid pressure damage occurred due to the inner pressure, and leakage of the electrolyte solution occurred. It is seen from these results that, even with a long length W or a large area S, it is possible to suppress at least leakage without mechanical deformation or damage to the cell frames 120 and displacement of the cell frames 120 by setting the W/S to 0.05 or more and 0.9 or less. It is possible to suppress creep deformation and liquid pressure damage depending on the materials of the frame members 122 of the cell frames 120.

Figure 10:
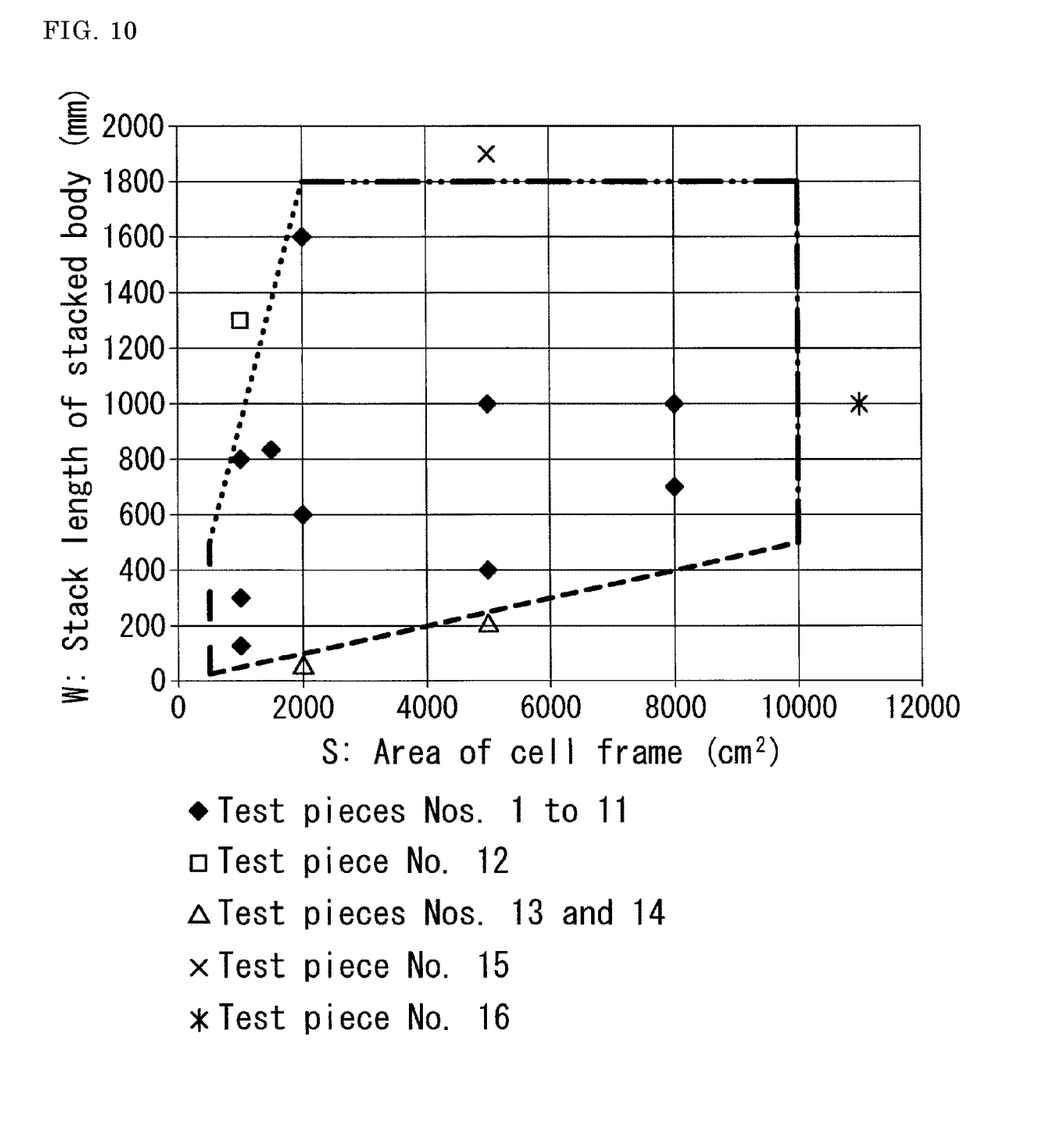
FIG. 10 is a graph showing a result of Test Example 1.

Next, the measurement results shown in Table 1 were expressed in the form of a graph to see the range of W/S in which none of the problems shown in Table 1 occurred. FIG. 10 is a graph in which the measurement results of Table 1 were plotted. In FIG. 10, the horizontal axis indicates the area S of the cell frames 120, and the vertical axis indicates the length W in the stacking direction of the stacked body 30. The results of the test pieces Nos. 1 to 11 in which no problem occurred were plotted as diamonds, those of the test piece No. 12 in which the cell frames 120 were displaced were plotted as quadrangles, those of the test pieces Nos. 13 and 14 in which leakage occurred were plotted as triangles, those of the test piece No. 15 in which creep deformation occurred were plotted as crosses, and those of the test piece No. 16 in which liquid pressure damage occurred were plotted as asterisks.

As shown in FIG. 10, five straight lines defining the region including the test pieces Nos. 1 to 11 were obtained. Each straight line was obtained through calculation from the test results.

Broken line in the vertical axis direction . . . $S=500$ cm$^2$, $W=25$ to 450 mm Dot line extending diagonally up and to the right . . . $W=0.9$ S, $S=500$ to 2000 cm$^2$ Dash-double-dot line in horizontal axis direction . . . $W=1800$ mm, $S=2000$ to 10000 cm$^2$ Dash-dot line in vertical axis direction . . . $S=10000$ cm$^2$, $W=500$ to 1800 mm Broken line extending diagonally up and to the right . . . $W=0.05$ S It seems that there is no problem in the stacked body 30 in which the length W and the area S are in the range defined by the five straight lines in FIG. 10.

Test Example 2

In Test Example 2, a research was conducted on how the difference between the surface roughnesses of the frame facing surfaces 20f of the cell frames 2 shown in FIG. 6 affects leakage of an electrolyte solution in the cell stack 3. Five cell stacks (test pieces Q to U) in which the frame facing surface 20f had different surface roughnesses were prepared, and it was tested whether or not an electrolyte solution leaked to the outside of each cell stack in a state in which the electrolyte solution was circulated in the cell stack. The test pieces Q to U had the following schematic configurations.

Test piece Q . . . Surface roughness Ra of frame facing surfaces 20f=0.03 μm

Test piece R . . . Surface roughness Ra of frame facing surfaces 20f=1.5 μm

Test piece S . . . Surface roughness Ra of frame facing surfaces 20f=3.2 μm

Test piece T . . . Surface roughness Ra of frame facing surfaces 20f=0.01 μm

Test piece U . . . Surface roughness Ra of frame facing surfaces 20f=3.5 μm

An electrolyte solution was caused to flow in the test pieces Q to U. At that time, the pressure of the electrolyte solution that was caused to flow was gradually increased. As a result, some of the adjacent cell frames in the test piece T were displaced from each other, and an electrolyte solution leaked from the displaced portion. Furthermore, adjacent cell frames were not displaced in the test piece U, but leakage of an electrolyte solution occurred. On the other hand, in the test pieces Q, R, and S in which an electrolyte solution was caused to flow at the same pressure, adjacent cell frames were not displaced, and leakage of an electrolyte solution did not occur.

It is seen from these results of the test example that it is effective to set the surface roughness of the frame facing surfaces of the cell frames within a predetermined range, in order to suppress leakage of an electrolyte solution from the cell stack.

Test Example 3

In Test Example 3, a cell stack (test piece W) was prepared in which the shift amount between the outer peripheral end portions 22E in all cell frame pairs 4 and 5 included in the cell stack 3 (FIG. 8) was approximately 0.5 mm to 3.0 mm. Furthermore, a cell stack (test piece X) was prepared in which the shift amount between the outer peripheral end portions 22E in all cell frame pairs 4 and 5 included in the cell stack 3 was approximately 0.3 mm. Then, the tightening force of the tightening mechanism of the cell stack 3 was gradually increased. As a result, the frame members 22 of the cell frames 2 included in the test piece X were broken when the tightening force reached a certain value, but the frame members 22 of the cell frames 2 included in the test piece W tightened at the same tightening force were not broken.

It is seen from these results of Test Example 3 that it is effective to shift the outer peripheral end portion 22E of the frame member 22 included in the first cell frame 2A (2B) constituting the cell frame pairs 4 and 5 and the outer peripheral end portion 22E of the frame member 22 included in the second cell frame 2B (2C) constituting the cell frame pairs 4 and 5 by 0.5 mm or more, in order to suppress breakage of the cell frames 2A, 2B, and 2C when the cell stack 3 is tightened.

Applications

The cell stack according to the embodiment can be preferably used to construct flow storage cells such as RF batteries. Furthermore, the RF battery including the cell stack of the embodiment can be used in new energy generation such as solar photovoltaic power generation and wind power generation, as storage cells that are to stabilize a change in the generated power, to store electric power when it is excessively generated, to level the load, and the like. In addition, the RF battery including the cell stack of the embodiment can be used also as large-capacity storage cells that are installed in typical power plants and that are to measure against an instantaneous voltage drop and a blackout, and to level the load.

LIST OF REFERENCE NUMERALS

1 RF battery (redox flow battery)
2, 2A, 2B, 2C, 120 Cell frame
  21, 121 Bipolar plate
  22, 122 Frame member
  22E Outer peripheral end portion
  22R Thin region
  20f Frame facing surface
  123, 124 Supply manifold
  125, 126 Discharge manifold
  123s, 124s Inlet slit
  125s, 126s Outlet slit
  127 Ring-like sealing member
3 Cell stack
  30 Stacked body
4, 5 Cell frame pair
100 Cell
  101 Membrane
  102 Positive electrode cell
  103 Negative electrode cell
  100P Positive electrode circulation mechanism
  100N Negative electrode circulation mechanism
  104 Positive electrode
  105 Negative electrode
  106 Positive electrolyte solution tank
  107 Negative electrolyte solution tank
  108, 109, 110, 111 Pipe
  112, 113 Pump
200 Cell stack
  210 End supply/discharge plate
  211 Middle supply/discharge plate
  220 End plate

The invention claimed is:

1. A cell stack comprising:
    a stacked body including a plurality of cell frames each having a bipolar plate whose outer periphery is supported by a frame member; and
    a pair of end plates that tighten the stacked body from both sides of a stacking direction thereof,
    wherein an area S cm$^2$ of each cell frame as viewed from the stacking direction of the stacked body and a length W mm in the stacking direction of the stacked body satisfies a relationship $0.06875 \times S + 56.25 \leq W \leq 0.9 \times S$, and
    wherein the frame member of each cell frame includes a frame facing surface that faces a frame member of another cell frame adjacent to the cell frame in the stacking direction.

2. The cell stack according to claim 1, wherein the length W is 1800 mm or less.

3. The cell stack according to claim 1, wherein the area S is 10000 cm$^2$ or less.

4. The cell stack according to claim 1,
    wherein
    a surface roughness Ra of the frame facing surfaces is 0.03 μm or more and 3.2 μm or less.

5. The cell stack according to claim 1,
    wherein the frame member has an outer peripheral portion with a predetermined width including an outer peripheral end portion, and
    the outer peripheral portion includes a thin region whose thickness gradually decreases from a center of the frame member toward the outer peripheral end portion.

6. The cell stack according to claim 5, wherein, in a cross-section along a thickness direction of the frame member, a cross-sectional shape of the thin region is any one of a pencil-down shape, a rounded chamfer shape, and a flat chamfer shape.

7. The cell stack according to claim 1,
    wherein the frame member has a thickness along an axial direction of the frame member, and a length and a width orthogonal to the axial direction and extending at a right angle with each other, and
    the thickness is shorter than the length and shorter than the width.

8. The cell stack according to claim 7, wherein the length of the frame member is longer than the width of the frame member.

9. The cell stack according to claim 7, wherein the length of the frame member is shorter than the width of the frame member.

10. The cell stack according to claim 7, wherein the thickness of the frame member is 3 mm or more and 10 mm or less.

11. The cell stack according to claim 1,
    wherein, when a pair of the cell frames that are adjacent to each other in the stacking direction are respectively taken as a first cell frame and a second cell frame, and a combination of the first cell frame and the second cell frame is taken as a cell frame pair,
    in the cell frame pair,
    an outer peripheral end portion of the frame member included in the first cell frame is shifted from an outer peripheral end portion of the frame member included in the second cell frame, in a direction that intersects the stacking direction, by 0.5 mm or more and 20 mm or less.

12. A redox flow battery comprising the cell stack according to claim 1.

* * * * *